United States Patent [19]

Virdee et al.

[11] Patent Number: 4,792,949

[45] Date of Patent: Dec. 20, 1988

[54] SERVICE CHANNEL CIRCUIT FOR MULTIPLEXED TELECOMMUNICATIONS TRANSMISSION SYSTEMS

[75] Inventors: Harbhajan S. Virdee, Phoenix; Hamid R. Rezaie, Glendale, both of Ariz.

[73] Assignee: Siemens Transmission Systems, Inc., Phoenix, Ariz.

[21] Appl. No.: 30,754

[22] Filed: Mar. 26, 1987

[51] Int. Cl.[4] .................................................. H04J 3/04
[52] U.S. Cl. ...................................... 370/112; 380/49
[58] Field of Search ....................... 370/110.1, 85, 112; 380/49

[56] References Cited

U.S. PATENT DOCUMENTS 4,172,968 10/1979 Steinberg et al. ...................... 380/49
4,445,215 4/1984 Svendsen ............................ 370/112
4,581,246 4/1986 Arnold ................................. 380/49

*Primary Examiner*—Douglas W. Olms
*Assistant Examiner*—Frank M. Scutch, III
*Attorney, Agent, or Firm*—Jeffrey P. Morris

[57] ABSTRACT

In accordance with the present invention a plurality of input control data bits are added to a plurality of input telecommunications transmission channels in the form of an input control word wherein any of the individual data bits can be changed without adversely effecting the ability of the system to synchronize and recover the added control word from the multiplexed data stream at the receiving end. A service channel is thus provided. The synchronization circuit described by the present invention is particularly useful in telecommunications transmission of a large plurality of communication channels as is the case in fiber optic transmission wherein a single control word may be useful, for example, as an alarm with respect to one or more of the multiplex telecommunications channels. In a preferred embodiment of the invention, an 8 Kbit/sec control channel is described.

7 Claims, 4 Drawing Sheets

SERVICE CHANNEL CIRCUIT FOR MULTIPLEXED TELECOMMUNICATIONS TRANSMISSION SYSTEMS

BACKGROUND OF THE INVENTION

1. Field of the Invention

The present invention relates generally to a communications system between one or more remote terminals and a host terminal over a telecommunications transmission line for transmitting a plurality of channels of telecommunications information and which may also include a fiber optic transmission line. A plurality of control signals or sensed data are added and communicated in either direction on the transmission line utilizing a serial channel. The present invention contemplates an optical drop in the case of a fiber optic communications channel in which a control word may be added and multiplexed together with other channels for transmission over a fiber optic transmission line.

2. Description of the Prior Art

It is well known in telecommunications transmission and in particular in telecommunications transmission over fiber optic transmission lines to combine a plurality of channels such as, for example 672 voice (DS0) telephone channels including up to 28 DS1, 14DS1C or 7DS2 channels together in a digital multiplexer to multiplex and demultiplex the various combinations of DS1, DS1C and DS2 signals to and from a single DS3 signal for fiber optic transmission at a DS3 rate of 44.736 Mb/sec. Even higher fiber optic transmission rates of 143.36 Mb/sec. may also be utilized to multiplex and demultiplex up to 2,016 digitized voice channels or equivalent DS0 signals to and from the 143.36 megabit data stream. Between the communications terminals at either end of the fiber optic span, a drop and insert repeater may provide for the extension of fiber spans and access to other DS1 or equivalent DS1C or DS2 signals. A problem in the known prior art is that it is sometimes necessary, particularly in an add drop, configuration to add additional control information into the communications channels already multiplexed and transmitted over the telecommunications line while at the same time insuring that synchronization is maintained between the additional control information to be added and the extraction of the added control at the far end receiver such that synchronization is always maintained between the control word added and the transmitted channelized data regardless of whether or not the added control bits of the added control word are varied or changed over time and in particular over a very short time interval.

SUMMARY OF THE INVENTION

In accordance with the present invention a plurality of input control data bits are added to a plurality of input telecommunications tranmmission channels in the form of an input control word wherein any of the individual data bits can be changed without adversely effecting the ability of the system to synchronize and recover the added control word from the multiplexed data stream at the receiving end. A service channel is thus provided. The synchronization circuit described by the present invention is particularly useful in telecommunications transmission of a large plurality of communication channels as is the case in fiber optic transmission wherein a single control word may be useful, for example, as an alarm with respect to one or more of the multiplex telecommunications channels. In a preferred embodiment of the invention, an 8K bit/sec control channel is described.

DESCRIPTION OF THE PREFERRED EMBODIMENT

Figure 1:
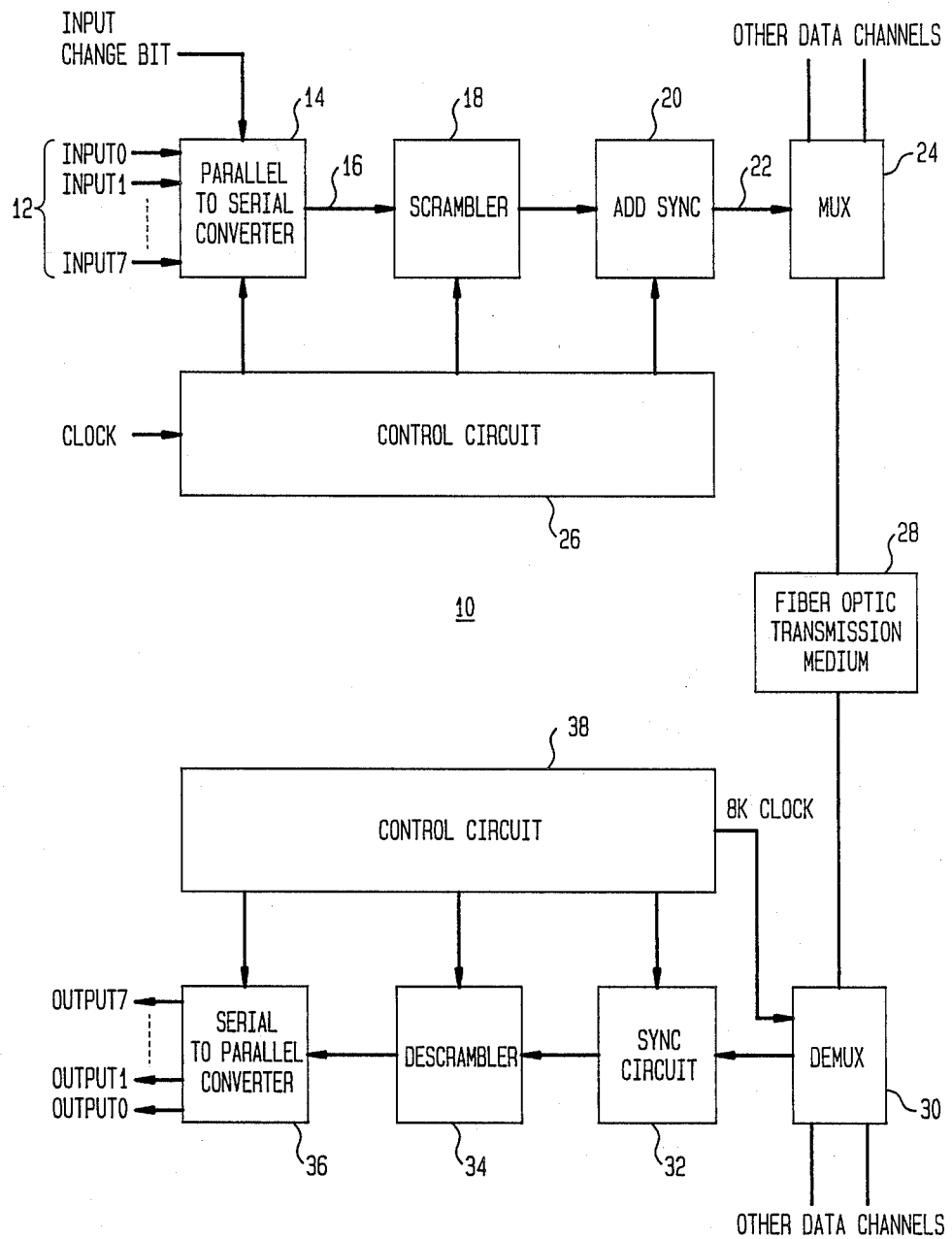
FIG. 1 is a block diagram of a circuit for multiplexing a service channel into a plurality of data channels with the capability of adding and extracting synchronization in response to input control signals, in accordance with the present invention.

Referring to FIG. 1, a block diagram of a circuit for adding a service channel into a plurality of multiplexed telecommunications and/or data channels for transmission in a fiber optic communication system is illustrated generally at 10. For the embodiment described hereinafter, an 8K bit/sec. service channel is described, which is multiplexed with other data channels including DS1, DS1C, and DS2 channelized data. A typical DS1 data channel may include twenty-four 64K bit/sec PCM voice channels, one of which 64K bit/sec channels can be divided into eight 8K bit/sec channels, of which one such 8K bit/sec channel is used by the present invention. The service channel is added as 10 0.8K bit/sec single bit serial inputs (8 control+2 sync.) in this 8K bit/sec channel. It is to be understood, however, that the other seven 8K bit/sec channels can also be used by seven additional service channel addition circuits of the present invention, or other higher or lower bit rate channels can be used. The single inserted 8K bit channel described herein is an example of one of many possible single or plural service channels that can be multiplexed into the transmission data stream and accurately synchronized in accordance with the present invention. A control channel 12 including eight inputs 0 through 7 are coupled in parallel to a parallel to serial converter 14. Typically, the control input 12 is derived from eight different sensing points in a telecommunication system, and may be, for example, single bit alarms such as ON-HOOK, OFF-HOOK, sensed temperature, etc. Each one-bit control input may be at a 0.8K/sec rate, which is converted to a single 8-Kbit/sec framing pattern on line 16 after parallel-to-serial conversion by parallel-to-serial converter 14. The 8-Kbit/sec control words on line 16 are scrambled at scrambler 18 to randomize the bit pattern of the serially converted control/sense point data. This randomization prevents a synchronizing pattern from occuring from any combination of input points. Scrambler 18 may comprise a four-step scrambler having feedback from the third and fourth stages. Other well known scramblers may also be used. Synchroniznng information in the form of start and stop bits after each 8-bit control word is added by synchronization addition circuit 20 in gaps in the clock, as will be explained with reference to FIG. 2. These synchronization bits are inserted after the scrambling process such that the output data on line 22 which is multiplexed with other framed telecommunications data by multiplexer 24 contains the synchronization bits at a periodic rate.

The control circuit 26 provides a gapped clock signal to the shift register 14, to the scrambler 18 and to the synchronizing bit addition circuit 20. The control circuit 26 may comprise, for example a, modulo-10 counter which resets to synchronize the next bit to insure that the right data is clocked into the right places. The multiplexed data from multiplexer 24 is multiplexed up to an appropriate fiber optic transmission rate and is transmitted over a fiber optic transmission medium shown representatively at 28 to a demultiplexing circuit 30 at the receiver.

The 8-Kbit control words are recovered at the demultiplexer 30. After synchronization at synchronization circuit 32 the data is descrambled at descrambler 34 and converted to a parallel format to provide the corresponding control and/or sense points with respect to the data control inputs 0 through 7 at 12. It is to be understood that the simplified FIG. 1 describes only one direction of communication, from host transmitter to a remote receiver terminal; however, it is to be understood that communication in the other direction, i.e. from the remote terminal to the host terminal may be accomplished in precisely the same manner. Additionally, in the description of FIG. 1, the transmission medium is illustrated as a fiber optic medium with the data and control words multiplexed up to appropriate fiber optic transmission rates. However, it is to be understood that any transmission medium having the capacity of transmitting at least 8K bit/sec serial data may be utilized. The receiver functions to resynchronize in an appropriate time in the event that synchronization is lost due to system malfunction or errors. At the synchronization circuit 32 the synchronization procedure consists of locating the synch bits in the received 8-Kbit/sec data stream and establishing a reference point for allocating data bits to the appropriate control points. Incoming data is clocked into a shift register to affect a serial to parallel conversion at 36, all of which is under the control of a control circuit 38, which includes a twelve step counter for counting to twelve and maintaining the count until a synchronization bit is located, then resetting; however the counter 38 will then function as a modulo-10 counter after reset for maintaining synchronization. The specific details of the circuitry comprehended within the simplified block diagram of FIG. 1 is described with reference to FIGS. 2, 3 and 4 wherein the transmitter portion, the receiver portion and various waveforms useful in describing the operation of the control word insertion and synchronization technique of the invention will now be explained.

Figure 2:
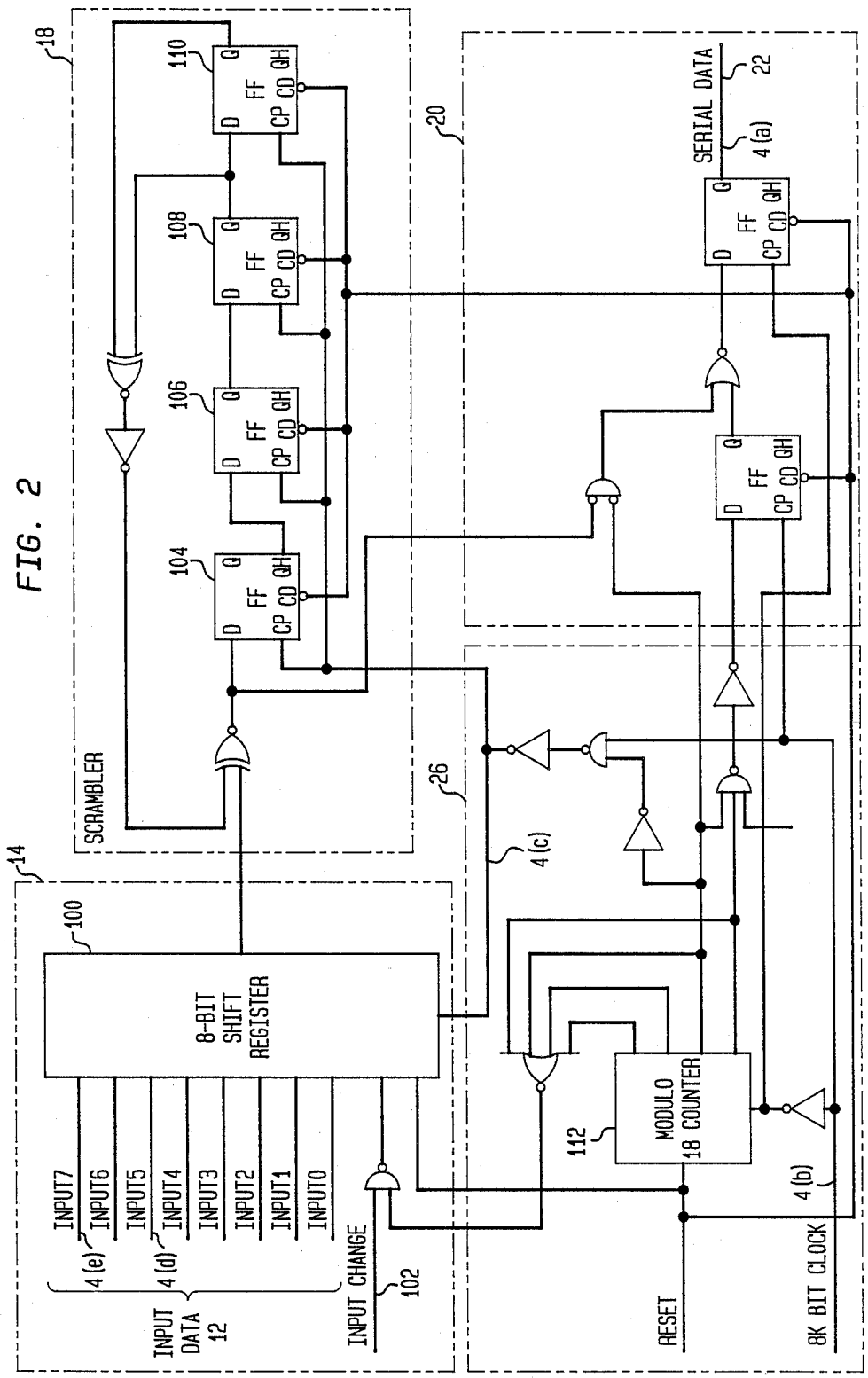
FIG. 2 is a circuit diagram of the transmitter portion of the circuit described with reference to FIG. 1.

The control word transmitter portion of the circuit of FIG. 1 as shown in detail in FIG. 2 converts the parallel 8-bits of input control data into the 8-Kbit control channel word. These inputs are coupled to an 8-bit shift register 100 together with an input change bit on line 102 which is also coupled to the 8-bit shift register 100. Shift register 100 performs the parallel-to-serial conversion and a gapped clock illustrated by the waveform 4(c) is used to clock the shift register that can be loaded in parallel with the inputs 0 through 7 of the control/sense point data. The waveforms of inputs 5 and 7 are illustrated by way of example by the waveform diagrams of 4(d) and 4(e) respectively. By way of illustration, the gapped clock 4(c) has a frequency of 8-kHz and for every 8 clock pulses there are two pulses that are missing, i.e. the gaps, as is apparent from the waveform of FIG. 4(c). One of the missing clock pulses is used to load in the fresh data which, for example, may be the input change pulse. In the event that any control sense point input 0 through 7 changes during the shift register load operation, then the data is not loaded since such loading would result in erroneous data being loaded into the shift register 100. The changed data is then loaded during the next load cycle. Thus it can be seen that there is a restriction on the rate at which the control/sense points can change. As an example and in accordance with conventional circuit parameters, the inputs 0 through 7 are required to be stable for an approximate minimum of 2-milliseconds in order that they can be transmitted through the circuit. This is more than adequate for typical alarms such as ON-HOOK and OFF-HOOK and temperature indications. The scrambler 18 which randomizes the serially converted inputs 0 through 7 is illustrated at 18 and in the example is illustrated as a simple four-stage scrambler with feedback at stages 3 and 4. The flip-flops forming scrambler 18 are illustrated at 104, 106, 108 and 110. The addition of synchronization information at the sync addition circuit 20 is accomplished by using the two gaps generated for every 8 data bits for a stop and a start sync bit which is clocked in such that the sync bits are inserted after the scrambler 18 completes the scrambling of the input control bits and such that the output serial data always has these bits at at periodic rate—that is, the sync bit. The serial data on line 22 is illustrated by waveform 4(a). The 8-kHz clock into the control circuit 26 is illustrated by the waveform at 4(b). Control circuit 26 includes a modulo-10 counter 112 which clocks the data inputs 0 through 7 through the shift register 100 and is used to ggenerate the gapped clock shown by waveform 4(c). The gaps in the gapped clock are filled by the start and stop synchronization bits generated by the sync addition circuit 20 and are used to load in fresh data unless any input 0 through 7 control data is changed during the load operation in which case data is loaded during the next load cycle. Synchronization is thus accurately added notwithstanding the fact that the input control data may change. As can be seen with reference now to FIG. 3, the synchronization can also be accurately extracted notwithstanding changing of input control bits.

Figure 3:
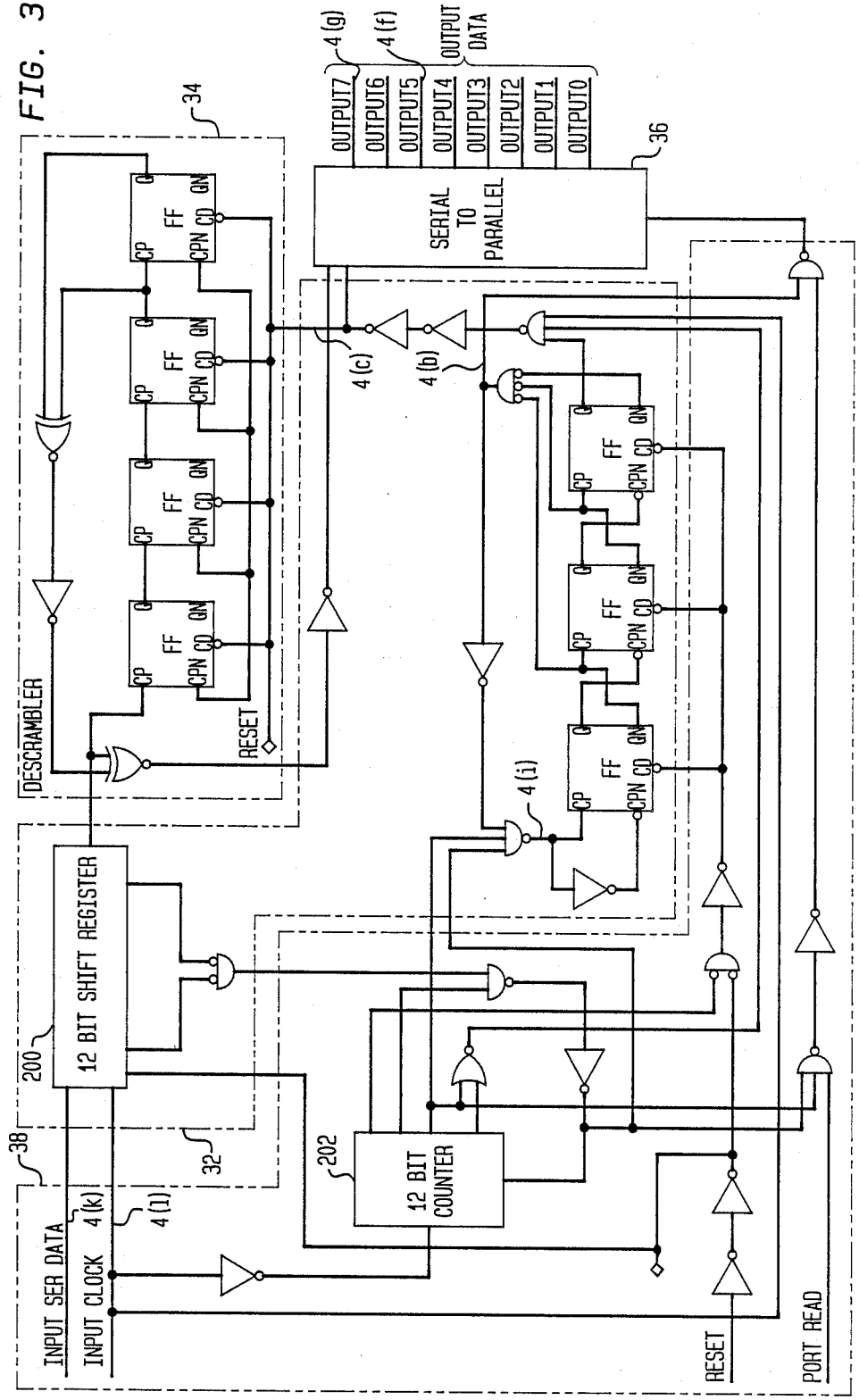
FIG. 3 is a circuit diagram of the receiver portion of the circuit described with reference to FIG. 1.
Figure 4:
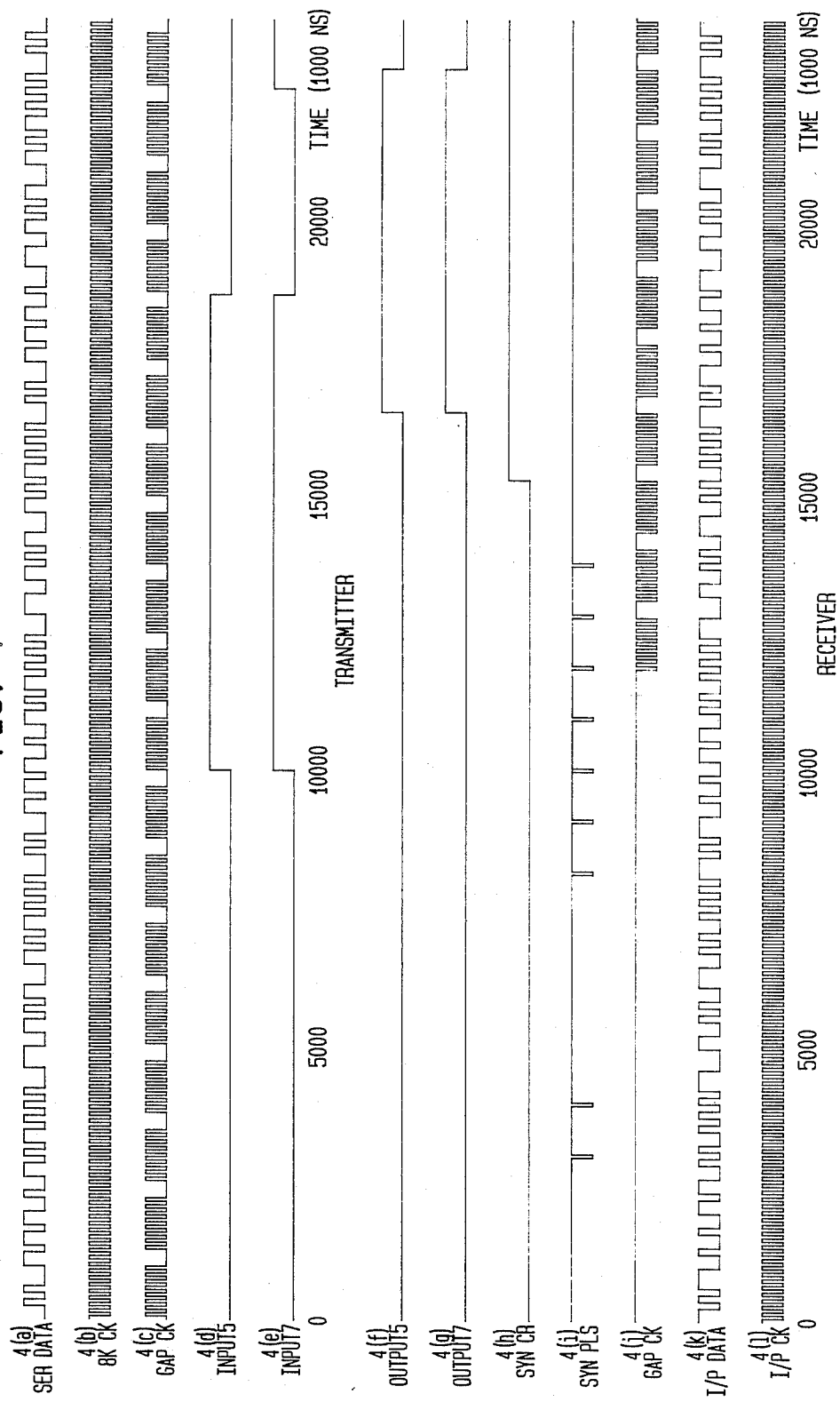
FIGS. 4(*a*)through 4(*l*) are waveform diagrams useful in explaining the operation of the transmitter and receiver circuits of the invention described with reference to FIG. 2 and FIG. 3.

At the receiver of FIG. 3, each bit of the 8-Kbit serial data is associated with the appropriate input control sense point data. The receiver resynchronizes when synchronization is lost in accordance with a synchronization procedure which is implemented by clocking incoming data from demultiplexer 30 where data at fiber optic transmission rates is demultiplexed down to conventional DS0, DS1, etc. data rates and is received as input serial data at a 12-bit shift register 200. The input serial data is illustrated by waveform 4(k) and the input clock is illustrated by waveform 4(l) both of which are illustrated as the data and clock inputs to shift register 200. When synchronization bits are found at the right stages of the shift register, a counter in the control circuit 38 illustrated at 202 as a 12 bit counter, starts counting. The sync counter 202 is reset when the sync bits ar not found at the right positions in the shift register. For example, when the counter reads 7, the data clocked into the serial to parallel converter 36 may be assumed to be valid. However, it is noted that data is clocked into the descrambler 34 from the moment the sync counter reads 4, for example. Thus, once the sync counter reaches a predetermined count of, for example, 7, it stays at that value unless the system goes out of sync. Thus, it can be seen that the counter 202 counts to 12, stays with the count until it finds a sync bit and then resets and functions in the same manner as the modulo-10 counter of the transmitter. The synchronization pulse is illustrated at waveform 4(i) and the outputs shown at waveforms 4(f) corresponding to output 5 and 4(g) corresponding to output 7 of the serial to parallel converter 36 are synchronized in accordance with waveform 4(h), the synchronization signal. The descrambler 34, is similar to the scrambler 18 described with reference to FIG. 2 in that feedback is provided at its third and fourth stages. The clock 4(c) a gapped clock, to the descrambler is gapped at the appropriate places so that the start/stop sync bits in the data stream are not clocked through. The descrambler 34 is reset at the start of the system (initialization) and data is not clocked through until four consecutive sets of sync bits have been found. The 8-bit shift register 36 which performs the serial-to-parallel conversion and which also includes an 8-bit latch function so that after all of the 8-bits of data have been loaded into the register 36 the data is loaded onto the 8-bit latch. In the event that during this load operation the data being transferred from the shift register to the latch and from the latch is being read by an external device, then the data is not loaded onto the latch. This prevents unknown conditions from being read by an external device. The data is then loaded during the next load cycle.

While the present invention has been described in connection with preferred embodiments thereof, it is to be understood that other embodiments, modifications and applications which will become obvious to those skilled in the art are included within the spirit and scope of the invention as set forth by the claims appended hereto.

What is claimed is:

1. A service channel addition circuit for a fiber optic telecommunicatins transmission system comprising:
    means for combining a plurality of parallel control inputs into serial control words;
    means for scrambling said serial control words;
    means for generating a gapped clock and clocking said control words with said gapped clock;
    means for inserting synchronization bits at a periodic rate into the scrambled control words in the gaps of said gapped clock; said synchronization bits being start and stop bits;
    means for multiplexing said synchronized control words into a desired channel in a telecommunications data stream for transmission over a transmission line.

2. A circuit in accordance with claim 1, wherein said multiplexing means includes means for multiplexing a plurality of DS1, DS1C and DS2 channels into a DS3 data stream.

3. A circuit in accordance with claim 1, wherein said control inputs consist of single bit alarm signals.

4. A circuit in accordance with claim 3, further including means for changing any of the parallel control inputs.

5. A circuit in accordance with claim 4, further including means for receiving said telecommunications data stream.

6. A circuit in accordance with claim 4, wherein said receiving means includes:
    demultiplexing means for extracting said control words;
    synchronization circuit means for locating said synchronization bits and clocking said telecommunications data when said synchronization bits are located, in accordance with a derived count, said count being derived from a synchronization counter which initiates its count when said synchronization bits are located;
    means for resetting said count when said synchronization bits are erroneous;
    descrambling means for descrambling said data; and
    serial-to-parallel conversion means for coupling said descrambled and synchronized data into a plurality of parallel outputs.

7. A communication system in accordance with claim 6, including a pluraiity of said service channel addition circuits for a plurality of parallel control word insertion channels for insertion into different channels of said multiplexed telecommunications data.

* * * * *